US009008368B2

(12) United States Patent
Joly et al.

(10) Patent No.: US 9,008,368 B2
(45) Date of Patent: Apr. 14, 2015

(54) METHOD FOR IDENTIFYING AND DEFINING BASIC PATTERNS FORMING THE TREAD PATTERN OF A TYRE

(75) Inventors: Alexandre Joly, Clermont-Ferrand Cedex (FR); Jean-Paul Zanella, Clermont-Ferrand Cedex (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 175 days.

(21) Appl. No.: 13/878,519

(22) PCT Filed: Oct. 6, 2011

(86) PCT No.: PCT/EP2011/067471
§ 371 (c)(1),
(2), (4) Date: Apr. 18, 2013

(87) PCT Pub. No.: WO2012/052301
PCT Pub. Date: Apr. 26, 2012

(65) Prior Publication Data
US 2013/0202156 A1 Aug. 8, 2013

(30) Foreign Application Priority Data

Oct. 19, 2010 (FR) ..................................... 10 58525

(51) Int. Cl.
*G06T 7/00* (2006.01)
*G01M 17/02* (2006.01)

(52) U.S. Cl.
CPC ........... *G06T 7/0002* (2013.01); *G01M 17/027* (2013.01)

(58) Field of Classification Search
CPC ..... G06T 7/0002; G06T 7/00; G01M 17/027; G01M 17/02; B60C 1/0016; B60C 11/03
USPC .................... 73/8, 146; 152/209.1, 295, 900; 382/104, 141; D12/502, 507–511, 514, D12/519, 527, 529, 531, 539, 546, 547, 551, D12/559, 562, 564, 566, 574
See application file for complete search history.

(56) References Cited

U.S. PATENT DOCUMENTS

| 2008/0209995 A1* | 9/2008 | Taylor et al. ..................... 73/146 |
| 2011/0013823 A1 | 1/2011 | Joly ............................... 382/141 |
| 2011/0019903 A1* | 1/2011 | Joly et al. ....................... 382/141 |

FOREIGN PATENT DOCUMENTS

WO WO 2009/077537 A1 6/2009

OTHER PUBLICATIONS

M. Sonka, V. Hlavac, and R. Boyle, *Image Processing, Analysis, and Machine Vision*, Chapman and Hall, London, pp. 200-220 (2002).
L. Roberts, "Machine Perception of Three-Dimensional Solids," in *Optical and Electro-Optical Information Processing*, edited by J.T. Tippett, MIT Press, Cambridge, MA, Ch. 9, pp. 159-197 (1965).
J. Canny, "A Computational Approach to Edge Detection," in *IEEE Transactions on Pattern Analysis and Machine Intelligence*, vol. PAMI-8, No. 6, pp. 679-698 (1986).

* cited by examiner

*Primary Examiner* — Gregory F Cunningham
(74) *Attorney, Agent, or Firm* — Fitzpatrick, Cella, Harper & Scinto

(57) ABSTRACT

A method for inspecting tire tread, having circumferentially juxtaposed elements separated by identically shaped boundaries and having patterns arranged in a predetermined sequence, includes: acquiring an image of a surface of the tire tread, the image including pixels associated with a light-intensity level; transforming the image by circumferentially offsetting pixels located axially at a same distance ($x_1$, $x_2$) from a given circumferential reference (OY), by an inverse ($-y_1$, $-y_2$) of a circumferential offset ($y_1$, $y_2$) with respect to an axial line (OX) of a point ($P_1$, $P_2$) located on a boundary line of known shape at the same axial distance ($x_1$, $x_2$) from the circumferential reference (OY), such that boundaries between elements appear as straight traces orientated in an axial direction; and analyzing the image to identify points located on an axially orientated straight line, the points being treated as points located on a boundary line between two elements.

12 Claims, 4 Drawing Sheets

METHOD FOR IDENTIFYING AND DEFINING BASIC PATTERNS FORMING THE TREAD PATTERN OF A TYRE

FIELD OF THE INVENTION

The invention relates to the field of the visual inspection of tyres, in which the image of a tyre to be inspected, generally provided by a digital acquisition means, is compared with a reference image of the tyre.

Comparison of these two images makes it possible to determine, by analysing the differences at a given point of the image, the variations of the value of a physical quantity assigned to this point and obtained from the acquisition means. The physical quantities measured by the sensor may relate to the colour, brilliance or texture of the observed object, or to the height of the points with respect to a reference surface, when equipment capable of creating a three-dimensional image is used.

These variations are analysed by means of algorithms which are not covered by the present description, and which are adapted to determine the degree of conformity of the tyre to be inspected, and to decide whether the tyre may be considered to be conforming or should be sent to a processing centre.

In the case of a tyre, this method is used to inspect regions of the tyre, such as the sidewall or tread, which are produced by moulding from a rigid impression.

BACKGROUND

The publication WO2009077537 describes a method specially adapted for the inspection of tyre treads whose tread pattern is formed by the assembly of elements having a small number of basic patterns juxtaposed circumferentially and arranged in sequence in a precise and specified manner.

The basic patterns of the tread pattern have similar shapes and have dimensions which are close to each other but not completely identical. Each type of basic pattern therefore appears several times on the circumference of the tread pattern of the tyre casing. The dimensions are chosen and the basic patterns are arranged in a carefully thought-out manner, by a procedure known to those skilled in the art, in order to reduce vibration or rolling noise.

The essence of the method described in the publication cited above is the comparison of the reference images of the basic patterns only with the image of the real basic patterns arranged on the circumference of the tyre.

Also according to this method, it is only necessary to acquire the image of the tread of a single tyre in order to obtain a sufficient collection of images of each of the basic patterns, and to calculate the average reference images of these basic patterns on the hypothesis that an anomaly is not likely to recur in all the elements having an identical basic pattern.

On the other hand, before this method is applied, the limits between the elements forming the tread pattern must be identified and located in a precise way in order to associate them with one of the basic patterns of the tread pattern.

BRIEF DESCRIPTION OF THE INVENTION

The object of the present invention is to propose a method enabling this problem to be overcome.

It should be noted that, as a general rule, the juxtaposition between two elements is never perfect. This is manifested in a slight circumferential offset which may result in rubber flash on the tyre surface, or in a radial offset which forms a shallow relief.

These offsets of a few hundredths of a millimeter are sufficient to produce fine traces which are visible on the tyre, and are therefore visible on the image of the tyre as well.

The object of the invention is to make advantageous use of this phenomenon.

The inspection method according to the invention is used on the tread of a tyre whose tread pattern is formed by the assembly of circumferentially juxtaposed elements which are separated from each other by boundaries of known shape and have a small number of basic patterns arranged in a predetermined sequence.

This method comprises steps in which:
an image of the surface of the tread of the tyre to be inspected is acquired, the image being formed of pixels associated with a level of light intensity,
the image of the tyre is transformed by circumferentially offsetting the pixels of the image located axially $(x_1, x_2)$ at the same distance from a given circumferential reference (OY) by the inverse $(-y_1, -y_2)$ of the circumferential offset $(y_1, y_2)$ with respect to an axial line (OX) of the point $(P_1, P_2)$ located on the boundary line of known shape at the same axial distance $(x_1, x_2)$ from said circumferential reference, in such a way that the boundaries between the elements appear in the form of straight traces orientated in the axial direction,
the image is analysed using a contour-detecting filter, so as to identify the points of the image placed on an axially orientated straight line, which are treated as the points placed on a boundary line between two elements.

The image of the surface of the tread may be a two-dimensional grey level or colour image, or alternatively a three-dimensional image transformed in such a way that the grey levels represent the relief values in the radial direction.

In order to improve the robustness of the detection, and where the image of the tread surface is a colour image formed by the assembly of a plurality of basic images, it may be useful to apply said method to each of the basic images.

Advantageously, a contour-detecting filter of the Sobel filter type is chosen, by means of which a Sobel angle is calculated for each pixel, indicating the direction of the greatest variation in light intensity.

In order to identify the boundaries between the elements, the average of the Sobel angles of the pixels located on an axial line is calculated, and the lines having the averages closest to the axial direction corresponding to the direction of the traces of the boundary lines are selected.

The method can also be used to determine a sequence of boundary lines between the elements of the acquired image.

Advantageously, an attempt is made to establish a correspondence between the sequence of boundary lines found in the acquired image of the tyre to be inspected and the predetermined sequence of the boundaries between the elements, in order to ensure that all the boundary lines present on the surface of the tread pattern have been detected.

The shapes of the boundaries may be identical regardless of the basic pattern, this being the most common case, but the tread pattern may also comprise basic patterns having boundaries of different shapes, in which case said method is applied for a number of times equal to the number of different boundary shapes included in said tread pattern.

It is also possible, after the detection of the points of the image representing boundaries between two elements, to re-transform the image by circumferentially offsetting the pixels of the image located axially $(x_1, x_2)$ at the same distance from the given circumferential reference (OY) by the same amount ($y_1$, $y_2$) as the circumferential offset ($y_1$, $y_2$) with respect to the axial line (OX) of the point ($P_1$, $P_2$) located on the known boundary line at the same axial distance ($x_1$, $x_2$) from said circumferential reference, so as to reconstitute the non-deformed image of the tyre surface.

By using this method it is possible to detect the limits between the elements of the tread using algorithms which are economical in terms of machine time. The method forms a preliminary step which can precede the use of an evaluation method such as that described in WO2009077537 cited above.

BRIEF DESCRIPTION OF THE DRAWINGS

The following description will provide a better understanding of the invention and its embodiments, and is based on FIGS. 1 to 8, in which.

DETAILED DESCRIPTION OF THE INVENTION

Figure 1:
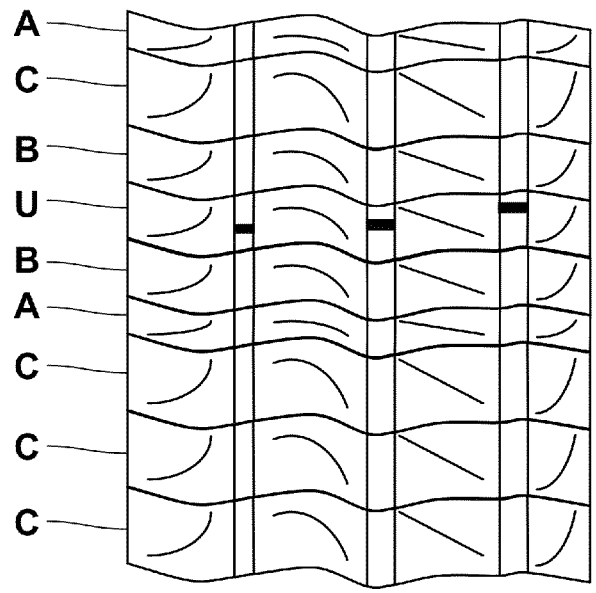
FIG. 1 is a schematic view of a tread formed by the juxtaposition of elements having basic patterns.

FIG. 1 shows a portion of a tyre tread in which the presence of a plurality of types of basic patterns, denoted A, B, C and U respectively, can be seen. These types of basic patterns are shown individually in FIG. 2, and comprise, for example, three patterns A, B, and C of different lengths, and a pattern U containing wear indicators. These four types of basic pattern are repeated in a precise sequence along the whole circumference of the tyre.

Thus the sequence of the portion of tread shown in FIG. 1 is a sequence denoted ACBUBACCC. For a given dimension of the range of tyres concerned, the final sequence is formed by the juxtaposition of these four types of basic pattern, arranged in a complex known sequence, starting with ACBUBACCC, and continuing, for example, with the patterns BCAABUAABCBCBAAABBUCACAACBAACBBAU and so on.

A dimension may comprise, as a general rule, one to five basic patterns, and a tread comprises, depending on the diameters, the repetition of eighty to one hundred and fifty basic patterns, arranged in the desired sequence. Consequently, a given type of basic pattern, for example the basic pattern A, will be used, depending on the dimensions and type of tread pattern, between ten and forty times in each tread.

The shape of the transverse boundaries of each of the types of basic pattern is then adapted so that it can mate equally well with the transverse boundary of any other type of basic pattern. Thus the shape of these boundaries is identical, regardless of the basic pattern concerned, in order to enable the sequence of basic patterns to be modified as required.

Figure 2:
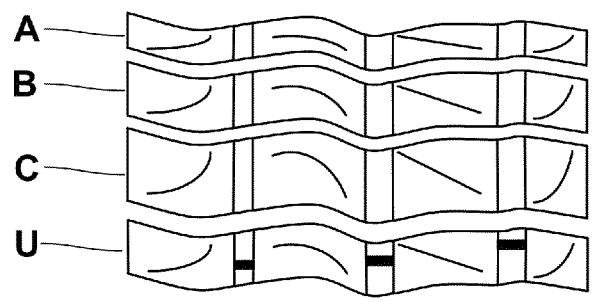
FIG. 2 shows the four basic patterns used to produce the design shown in FIG. 1.

The basic patterns shown in FIG. 2 occupy the whole transverse width of the tread. This arrangement is not limiting, and the principles of the invention may be extended to cases in which the tread pattern includes a plurality of basic patterns arranged on the same transverse line. This can be seen, in particular, in what are known as asymmetric tread patterns.

The first operation to be carried out is therefore the provision of an image of the surface of the tread of the tyre to be inspected. This image is obtained by making the tyre complete a full revolution under the acquisition means.

Figure 3:
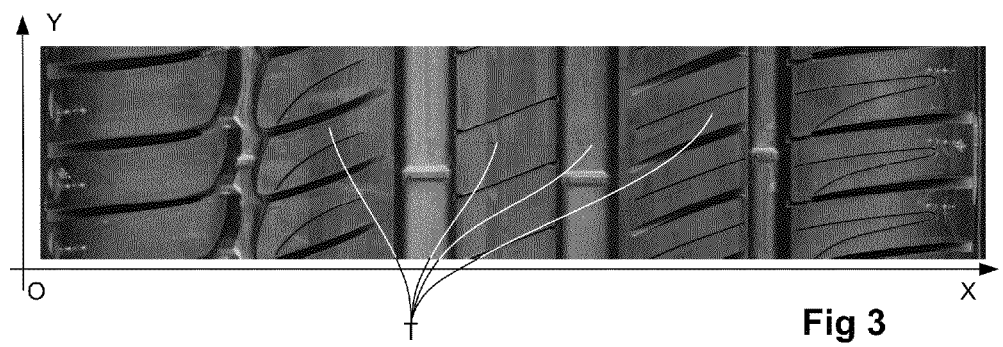
FIG. 3 shows an image of a tread in which the traces of the boundaries between the elements can be seen.

In this way the unrolled image of the tread is obtained, in which the axial direction of the tyre corresponds to the transverse direction of the image (OX) and the circumferential direction corresponds to the longitudinal direction (OY), as shown in FIG. 3. The radial direction (OZ) corresponds, in the case of three-dimensional images, to the direction of elevation of the relief elements of the patterns of the tread pattern.

The term "image" signifies the information obtained from one or more sensors sensitive to the light reflected at a given point by the tyre to be examined. This image may be two- or three-dimensional, and may be a grey level, monochrome or colour image. It may be obtained from a linear camera, a grey level or colour matrix camera, laser triangulation sensors, or the like. The three-dimensional image can itself be transformed into a two-dimensional image, by assigning a grey level value to each pixel of the image as a function of the value of the relief at this point in space.

An image is then presented in the form of a number of data tables or matrices equal to the number of measured physical quantities.

In the following description of the steps of the method, it is assumed for the sake of clarity that the image is a two-dimensional grey level image. A person skilled in the art will be able to make the necessary adaptations in order to adapt the method according to the invention to the type of image to be used.

FIG. 3 shows the effects caused by the presence of very small radial or circumferential offsets between the elements of the tyre tread, which are manifested in fine traces (T) visible on the images of the surface.

Before the following steps are carried out, the specific data relating to the dimension to be inspected are stored, these data being:

the specific known shape of the boundary line between the elements, the circumferential sequence of the elements present on a reference surface of the tyre to be inspected, and the sequence of the circumferential distances between the boundaries of the elements present on a reference surface of the tyre to be inspected.

Figure 4:
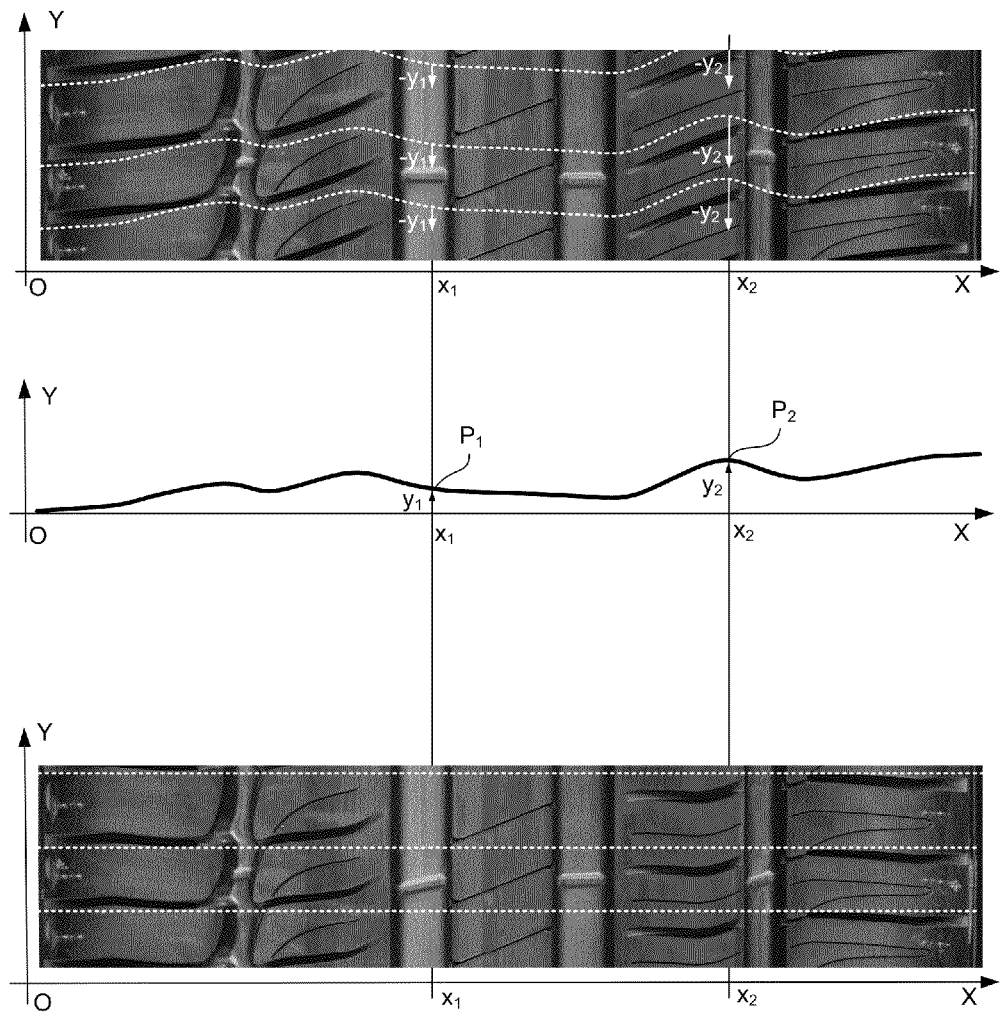
FIG. 4 shows the steps of the offsetting operation.

The next step of the application of the method is shown in FIG. 4.

The initial image in FIG. 4 is a reproduction of FIG. 3 in which the boundaries between the elements have been emphasized by a broken line.

The boundary line whose shape is known is shown in the aforementioned frame of reference OXY. In this frame of reference, coordinates can be assigned to all the points on this curve, for example the points $P_1$ ($x_1$, $y_1$), or $P_2$ ($x_2$, $y_2$).

The image of the tread is then placed in the same frame of reference OXY. This image is transformed in such a way that the pixels of the image located axially at the same distance from a given circumferential reference (OY), and corresponding to the points on the same abscissa in the frame of reference OXY, are translated circumferentially by an amount which is the inverse of the circumferential offset with respect to an axial line (OX) of the point located on a known boundary line at the same axial distance from said circumferential reference. The amount of this circumferential translation therefore corresponds to the inverse of the ordinate of the point of the boundary located at this abscissa.

Thus the pixels of the image located at the abscissa $x_1$ are translated circumferentially by an amount equal to $-y_1$, and the pixels of the image located at the abscissa $x_2$ are translated circumferentially by an amount equal to $-y_2$.

On completion of this transformation, the boundaries between the elements appear in the form of straight traces orientated in the axial direction as shown in the final image of FIG. 4. It should be noted that this transformation does not modify the circumferential distances, and that the sequence of circumferential distances between the straight traces corresponds to the sequence of the circumferential distances between the boundaries.

The next step is that of identifying these lines which are the visible signatures of the boundaries between the elements.

For this purpose, a search is made for the contours of the image which have a straight shape and an axial orientation.

The search for the contours may advantageously be conducted using digital image processing algorithms. These algorithms are based on the observation that the light or colour intensity levels vary considerably when there is a transition from one object in the image to another. A search is therefore made for the points of the image around which there is a rapid transition from bright to dark, and which are most likely to correspond to contours, and also for the orientation of these contours.

In mathematical terms, the gradient of a function having two variables (in the present case, the intensity of the grey level or colour as a function of the image coordinates) is a vector of dimension 2, whose coordinates are the derivatives in the axial and circumferential directions. At each point or pixel, the gradient points in the direction of the strongest change in intensity, and its length represents the rate of variation in this direction. At the contour, the gradient passes across the contour from the darkest intensities towards the brightest intensities.

Of the most commonly used algorithms, it is preferable to use filters which are matrix operators designed to execute a convolution between the image considered as a matrix of digital values and a convolution mask or filter which itself takes the form of a matrix. These algorithms are described in a general manner in the book published by S. Milan, H. Vaclav and B. Rogers in 2002 under the title *Image processing analysis and machine vision* (London, Chapman and Hall).

Among the most well-known algorithms, we may mention more particularly the Roberts algorithms, described in the paper published in 1965 by L. Roberts under the title *Machine perception of three dimensional solids* (J. T. Tippett, Optical and electro-optical information processing, Cambridge, Mass., MIT Press), the Canny algorithm as described in the paper published in 1986 by J. F. Canny under the title *A computational approach to edge detection* (IEEE Trans. Pattern Analysis and Machine Intelligence), and the Prewitt algorithm and its variant which is better known as the Sobel algorithm, as described by I. Sobel and G. Feldman under the title *A 3×3 isotropic gradient operator for image processing* (Talk Conference at the Stanford Artificial Project).

Although any of these algorithms may be suitable, the Sobel algorithm appears to have the most advantages in view of the relative simplicity of its implementation and its capacity to remain unaffected by high noise levels, which is particularly useful in the present case, owing to the low contrast of the trace forming the boundary between two elements.

The masks used take the form of two matrices:

$$\Delta_x = \begin{bmatrix} -1 & 0 & 1 \\ -2 & 0 & 2 \\ -1 & 0 & 1 \end{bmatrix}$$

and $$\Delta_y = \begin{bmatrix} 1 & 2 & 1 \\ 0 & 0 & 0 \\ -1 & -2 & -1 \end{bmatrix}$$

Let A be the source image. We then calculate at each point the value of $G_x = \Delta_x * A$ which highlights the contours in the axial direction, and $G_y = \Delta_y * A$ which highlights the contours in the circumferential direction.

The value of the intensity of the gradient of grey level or colour variation is approximated by the vector norm $G = \sqrt{G_x^2 + G_y^2}$, and the orientation $\Theta$ of the contour, more commonly known as the Sobel angle, is given by $$\Theta = \arctan\left(\frac{G_y}{G_x}\right).$$

This angle $\Theta$ is 90° for a pixel placed on a contour line which is horizontal, i.e. axial.

The search for the boundaries between the elements is therefore conducted by searching for sets of points having the same orientation of $\Theta = 90°$.

Figure 5:
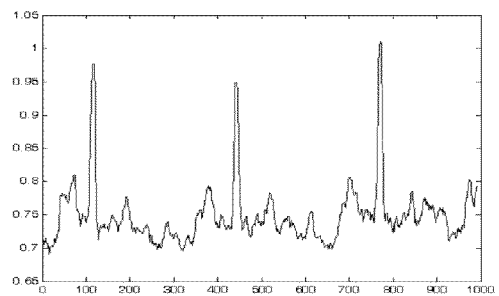
FIG. 5 shows a graph of the average of the Sobel angles on axial lines.

A simple way of doing this, for each axial line of pixels, is to find the average Sobel angle of the pixels located on the same axial line. Since all the pixels located on the trace of the boundary between two elements have substantially the same Sobel angle, the average of the Sobel angles of the pixels placed on the axial line representing a boundary will therefore be close to 90°, as shown in FIG. 5, in which the peaks represent the axial lines on which the Sobel angles are close to 90°.

We may therefore reasonably deduce that this axial line of pixels represents a boundary line, and that this line is placed circumferentially at a given distance from the origin.

We can then establish a first sequence of boundary lines located on the image of the tyre tread to be inspected, and evaluate the circumferential distances between each of the lines.

For this purpose, we predetermine the threshold beyond which the height of the peak which is highlighted corresponds in a practically unambiguous way to the location of a boundary. This value can be set, for example, at ¾ of the maximum height of the peak.

Figure 6:
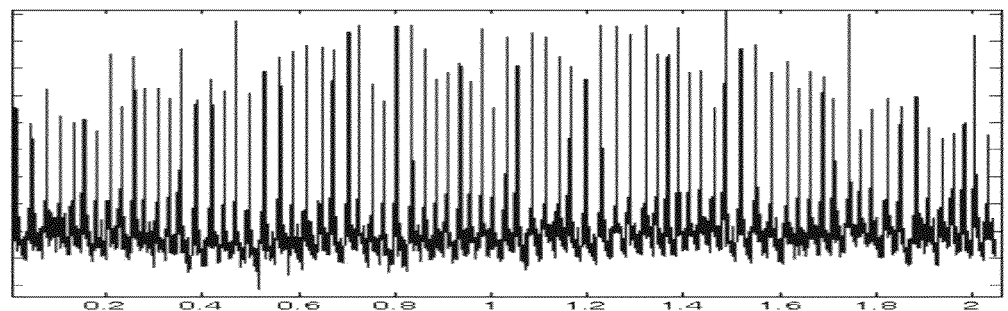
FIG. 6 shows a circumferential sequence of the boundary lines.

The peaks located above this threshold are then searched for and their positions are calculated. If the number of peaks detected is insufficient, the threshold value is reduced by one increment, until a significant number of peaks is located, corresponding for example to 80% of the theoretical number of peaks, the value of this number being known and corresponding to the number of boundaries and therefore to the number of elements forming the tread pattern of the tyre to be inspected. FIG. 6 shows a complete sequence of peaks located circumferentially.

It is then possible to calculate the sequence of peaks as a function of their circumferential position, and to compare this sequence with the known theoretical sequence of the dimension of the tyre, for example by searching for the minimum difference between the two sequences.

From this we can deduce a correspondence between the theoretical sequence and the actual sequence found on the image of the tyre tread to be inspected.

If the number of peaks detected is insufficient, the threshold is reduced by yet another increment, until a sufficient number of peaks has been detected, for example 95% of the boundaries (i.e. of the peaks).

The reduction of the detection threshold could be continued until all the boundaries had been detected, at the risk of increasing the number of false detections. It is preferable, therefore, not to reduce the detection threshold below a lower limit, for example 50% of the maximum threshold, which would, in practice, enable most of the boundaries to be detected, thus allowing resetting with the sequence of theoretical differences between elements.

The missing boundaries, corresponding to undetected boundaries, are then placed directly in the circumferential positions corresponding to their positions in the theoretical sequence.

Figure 7:
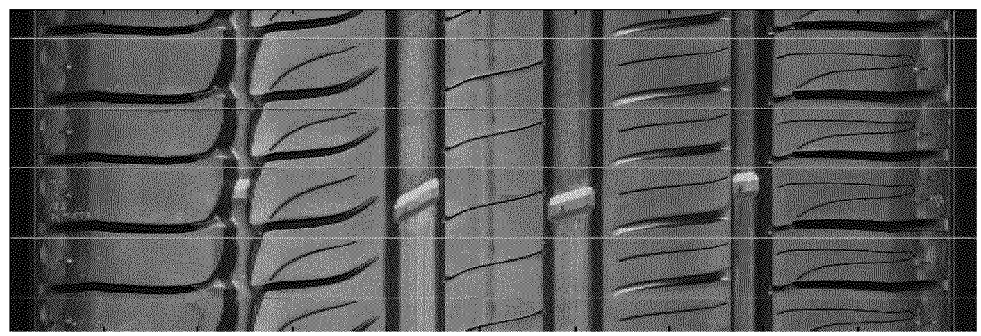
FIGS. 7 and 8 show the image of the tread after the highlighting of the boundaries, before and after offsetting.

On completion of this identification step, the set of boundaries between the elements is located on the image of the tyre tread to be inspected, as shown in FIG. 7.

The above description relates to tyres having identical boundary shapes. Clearly, the principles of the method are equally applicable when the tread pattern comprises patterns with different boundaries, for which it will be necessary to apply the method for a number of times equal to the number of patterns with different boundaries. Only the patterns having a given boundary shape will appear in the form of a radially orientated straight line, thus making it possible to identify only those boundaries whose shape corresponds to said shape.

It should also be noted at this stage that, if the tread image is a colour image, the three grey level images obtained from RGB-based sensors of the acquisition means can be processed in parallel. These basic images represent the images in the basic colours commonly used in colour image acquisition means, typically the colours Red (R), Green (G) and Blue (B). This is because the maximum values of the peaks may vary from one image and colour to another as a function of the illumination level and angles. In this case, it may prove useful to combine the data obtained from these three sensors, so as to remedy the false detections or missing detections.

If it is desired to reconstitute the exact shapes of the boundary lines on the image of the tyre tread to be inspected, the image may be transformed by circumferentially offsetting the pixels of the image located axially ($x_1$, $x_2$) at the same distance from the given circumferential reference (OY) by the same amount ($y_1$, $y_2$) as the circumferential offset ($y_1$, $y_2$) with respect to the axial line (OX) of the point ($P_1$, $P_2$) located on the known boundary line at the same axial distance ($x_1$, $x_2$) from said circumferential reference, so as to reconstitute the non-deformed image of the tyre surface.

Figure 8:
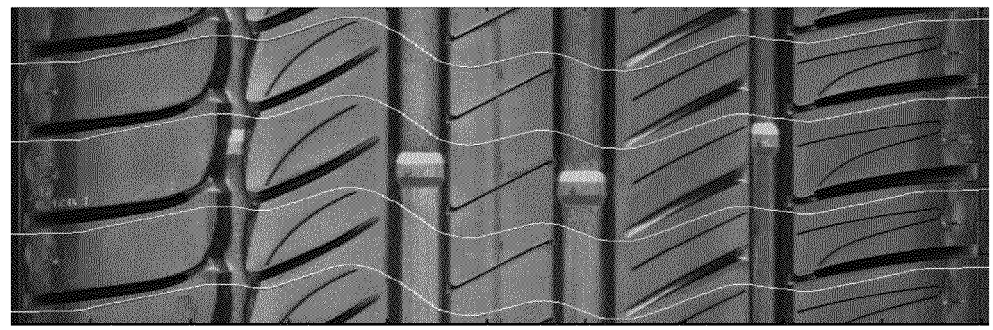

This is equivalent to performing an inverse transformation of the transformation performed previously. The pixels of the image located at the abscissa $x_1$ are translated circumferentially by an amount equal to $y_1$, and the pixels of the image located at the abscissa $x_2$ are translated circumferentially by an amount equal to $y_2$. FIG. 8 shows the image obtained after transformation, in which the boundary lines are perfectly marked.

It is then possible to divide the image along the boundary lines, so as to create collections of images of a single pattern, and to compare the images of each of these image collections with the reference image of the basic pattern which is assigned to them. This reference image may be an image obtained from the CAD model of the tread pattern, or an average image calculated from the image collection of a basic pattern, as described in WO2009077537.

The invention claimed is:

1. An inspection method for inspecting tyre tread, which has a tread pattern that includes circumferentially juxtaposed elements separated from each other by boundaries of known shapes, and that includes basic patterns arranged in a predetermined sequence, the method comprising steps of:

obtaining an image of a surface of a tyre tread to be inspected, the image being formed of pixels associated with a level of light intensity;

transforming the image by circumferentially offsetting pixels of the image located axially at a same axial distance ($x_1$, $x_2$) from a given circumferential reference (OY) by an inverse ($-y_1$, $-y_2$) of a circumferential offset ($y_1$, $y_2$) with respect to an axial line (OX) of a point ($P_1$, $P_2$) located on a boundary line of known shape at the same axial distance ($x_1$, $x_2$) from the circumferential reference (OY), such that boundaries between elements appear as straight traces orientated in an axial direction; and analyzing the image, using a contour-detecting filter, to identify points of the image located on an axially orientated straight line, the identified points representing points located on a boundary between two elements.

2. The inspection method according to claim 1, wherein the image is a two-dimensional grey-level or colour image.

3. The inspection method according to claim 2, wherein the image is a colour image formed from a plurality of RGB images, and wherein the inspection method is applied to each of the RGB images.

4. The inspection method according to claim 1, wherein the image is a three-dimensional image that is transformed such that grey levels represent relief values in a radial direction.

5. The inspection method according to claim 1, wherein
the contour-detecting filter is of a Sobel filter type, and
the contour-detecting filter calculates a Sobel angle for each pixel, indicating a direction of greatest variation in light intensity.

6. The inspection method according to claim 5, wherein an average of Sobel angles of pixels located on a same axial line is calculated.

7. The inspection method according to claim 6, wherein axial lines having average Sobel angles closest to the axial direction are identified as boundaries between two elements.

8. The inspection method according to claim 1, wherein a sequence of boundary lines between elements of the image is determined.

9. The inspection method according to claim 8, wherein a correspondence is established between the sequence of boundary lines determined for the image and a predetermined sequence of boundaries between elements, in order to ensure that all boundary lines present on the surface of the tyre tread have been detected.

10. The inspection method according to claim 1, wherein a shape of a boundary is identical for all basic patterns of the tyre tread.

11. The inspection method according to claim 1, wherein the tread pattern includes basic patterns having boundaries of different shapes, and wherein the inspection method is applied for a number of times equal to a number of different boundary shapes included in the tread pattern.

12. The inspection method according to claim 1, wherein, after the step of analyzing the image to identify the points of the image representing the boundary between two elements, the image is transformed by circumferentially offsetting the pixels of the image located axially at the same distance ($x_1$, $x_2$) from the given circumferential reference (OY) by an amount ($y_1$, $y_2$) equal to the circumferential offset ($y_1$, $y_2$) with respect to the axial line (OX) of the point ($P_1$, $P_2$) located on the known boundary line at the same axial distance ($x_1$, $x_2$) from the circumferential reference (OY), such that a non-deformed image of the surface of the tyre tread is reconstituted.

* * * * *